(12) United States Patent
Ruevski et al.

(10) Patent No.: US 6,362,886 B2
(45) Date of Patent: Mar. 26, 2002

(54) PORTABLE COLOR MEASURING DEVICE

(75) Inventors: Peter A. Ruevski, Lawrenceville, NJ (US); Stephen M. Dallas, Dublin, PA (US)

(73) Assignee: Applied Color Systems, Lawrenceville, NJ (US)

( * ) Notice: Subject to any disclaimer, the term of this patent is extended or adjusted under 35 U.S.C. 154(b) by 0 days.

(21) Appl. No.: 09/778,314

(22) Filed: Feb. 7, 2001

Related U.S. Application Data

(60) Provisional application No. 60/180,822, filed on Feb. 7, 2000.

(51) Int. Cl.[7] .................................................. G01J 3/50
(52) U.S. Cl. ........................ 356/402; 356/326; 250/226
(58) Field of Search ................................ 356/326, 328, 356/402, 405, 406, 407; 250/226

(56) References Cited

FOREIGN PATENT DOCUMENTS

EP        0836133 A2  *  4/1998   ................. 356/326

OTHER PUBLICATIONS

Photonics Spectra, Feb. 2000, p. 156.

* cited by examiner

*Primary Examiner*—F. L. Evans
(74) *Attorney, Agent, or Firm*—Calfee, Halter & Griswold LLP

(57) ABSTRACT

A portable color measuring device is provided that includes a hand-holdable housing. The color measuring device is configured to receive an independently operable processing device that is mounted to the housing. The independently operable processing device is a portable general purpose computer that executes software applications to control the operation of the color measuring device and process color data. The color measuring device measures the color properties of a sample by illuminating the sample with a light source. The measured properties are processed and/or analyzed by the independently operable processing device and results are displayed to a user. Software applications reside on the independently operable processing device allowing software upgrades or modifications to be easily performed. New applications can be downloaded to the processing device or the processing device can be interchanged with a different processing device.

29 Claims, 2 Drawing Sheets

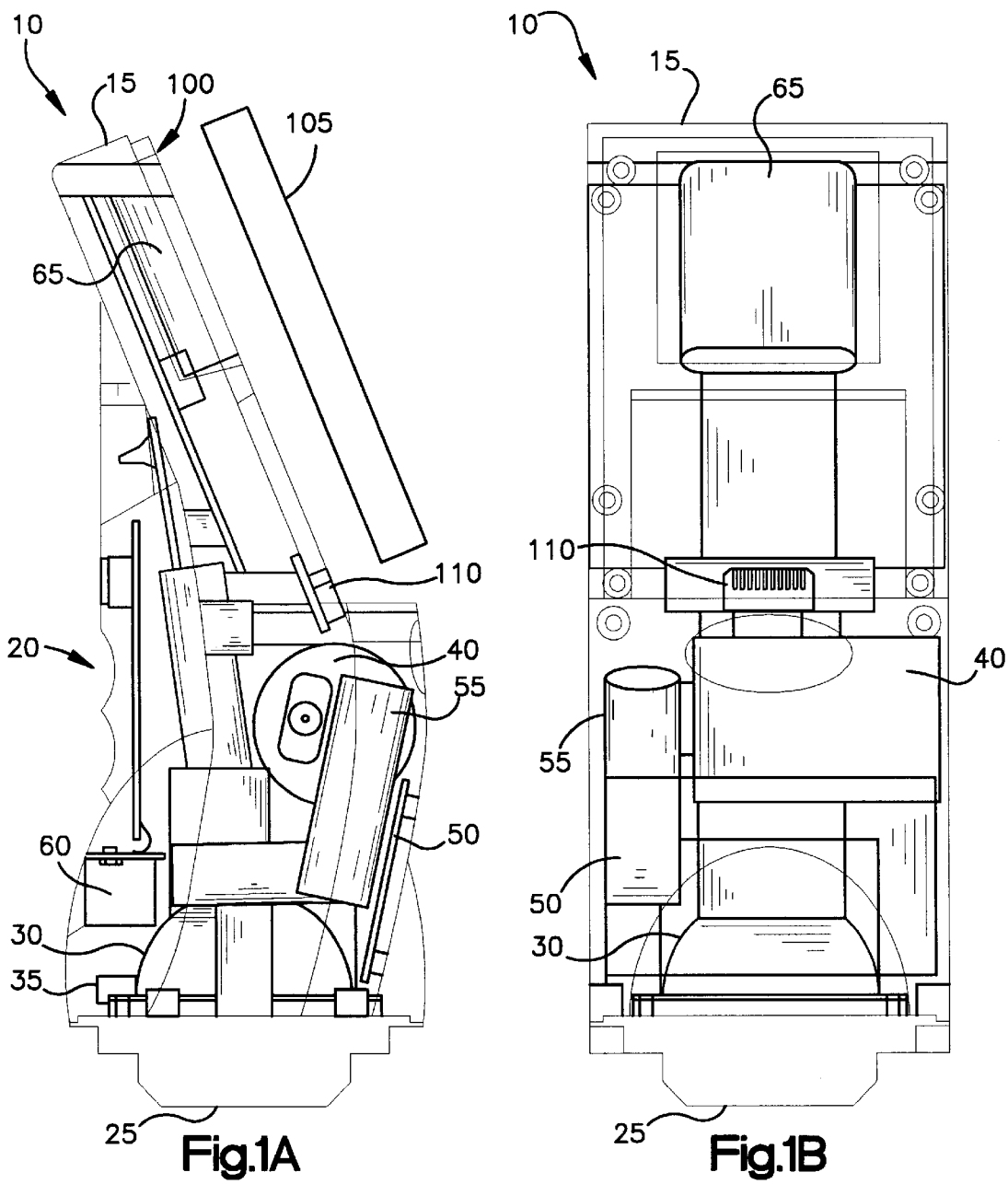

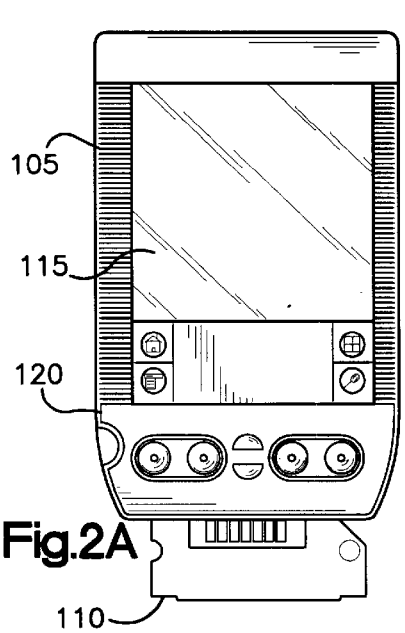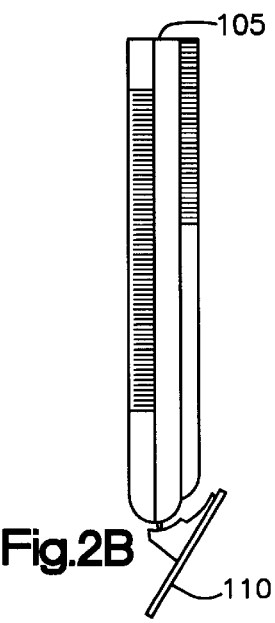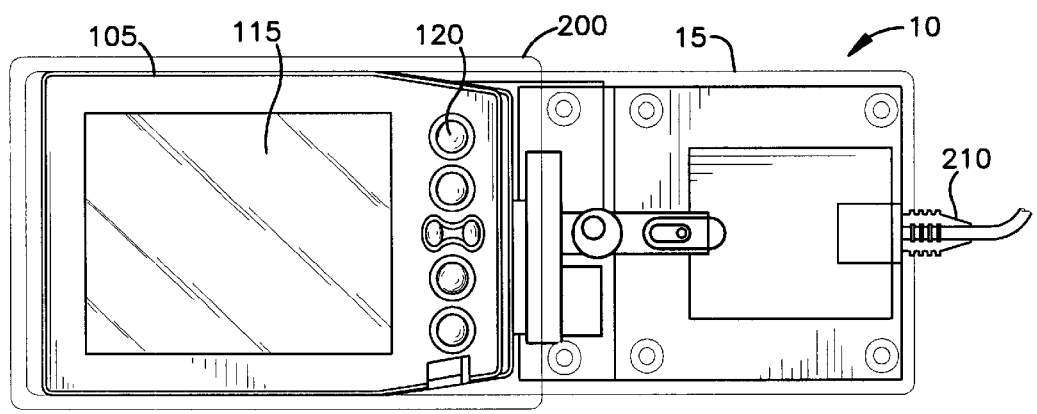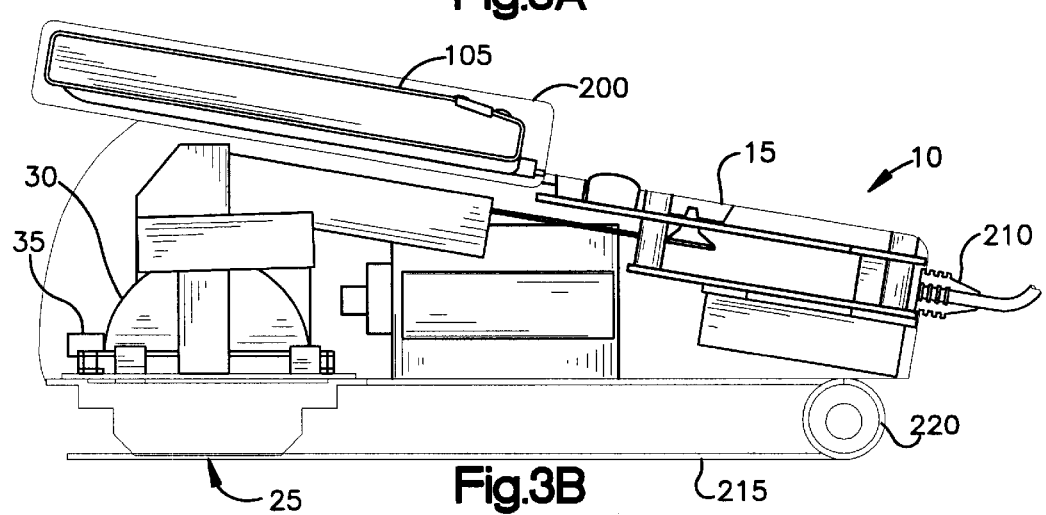

PORTABLE COLOR MEASURING DEVICE

CROSS-REFERENCE TO RELATED APPLICATIONS

This application claims the benefit of U.S. Provisional Application No. 60/180,822 filed Feb. 7, 2000.

FIELD OF THE INVENTION

The present invention relates to the spectral analysis arts. It finds particular application to a portable color measuring device that is configured to receive and function with an independently operable processing device. It will be appreciated that the present invention will also find application to color measuring devices such as spectrophotometers, calorimeters, tristimulus calorimeters, single and multiple beam spectrophotometers, Gonio spectrophotometers and the like, and light emission type measuring devices.

BACKGROUND OF THE INVENTION

Color measuring devices, such as spectrophotometers, are instruments used to determine the color of an object under test. They typically include a source of light that illuminates the object and a photodetector that detects and measures light signals reflected from the object. Then, signal processing circuitry connected to the photodetector computes curves or numerical values indicative of color. The general principles of construction and use of these instruments are well known and understood by those skilled in the art.

One known type of spectrophotometer uses an integrating sphere in which the light reflected from the object is integrated to obtain an average reading of the color over an exposed surface area of the object. Known integrating spheres can provide readings which represent "total" reflections or "diffuse-only" reflections. The total reflections include all reflections from the exposed object, including specular reflections from the surface and diffuse reflections from particles in the body of the object. A "diffuse-only" or specular-excluded measurement is obtained by excluding specular light that is reflected from the surface of the sample at an angle equal to the incident angle. This reflected light is referred to as the specular component. Exclusion of the specular component eliminates the light contribution due to gloss, and the color values obtained from a specular-excluded reading are independent of the glossiness of the surface of the object under test.

Typical bench-top or portable color measuring instruments include custom designed processing components such as a simple eight-bit processing unit and small amounts of memory. Most of the data processing function is performed by a remote personal computer that receives the measurement data from the spectrophotometer. Furthermore, the display is typically small and uses complicated menus and endless keystroke sequences to input and select data and request functions. Updating the device software requires a user to ship the entire spectrophotometer to the manufacturer. Overall, the device lacks flexibility and has limited processing power.

The present invention provides a new and unique color measuring device that cures the above problems and others.

SUMMARY OF THE INVENTION

In accordance with the present invention, a color measuring device for measuring color properties of an object is provided. The color measuring device includes a light source that transmits light onto the object. A sensor senses the light reflected from the object and generates electrical signals corresponding to the sensed light. The light source and the sensor are contained within a portable housing. The housing includes a mounting portion configured for mounting a portable independently operable computing device. An interface is configured to electrically connect a portable independently operable computing device to the portable housing and to communicate the electrical signals from the sensor to a portable independently operable computing device once mounted to the mounting portion and connected to the interface.

In accordance with a more limited aspect of the present invention, the color measuring device includes a portable independently operable computing device mounted to the portable housing and connected to the interface.

One advantage of the present invention is that a color measuring device can be produced in less time since custom made processing components and user interface and display are eliminated by configuring the color measuring device to mount an independently operatble computing device. With the present invention, the cost of manufacturing a color measuring device is also reduced.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein:

FIG. 1A is a transparent side view of a color measuring device in accordance with the present invention;

FIG. 1B is a transparent front view of FIG. 1A;

FIG. 2A illustrates a independently operable processing device connected to a data interface in accordance with the present invention;

FIG. 2B is a side view of FIG. 2A;

FIG. 3A is an alternative configuration of the present invention; and

FIG. 3B is a transparent side view of FIG. 3A.

DETAILED DESCRIPTION OF THE PREFERRED EMBODIMENTS

With reference to FIG. 1A and 1B, a side view and a front view, respectively, illustrate components of an exemplary color measuring device 10 in accordance with the present invention. For purposes of explanation, the color measuring device 10 is illustrated as a portable hand-held spectrophotometer. The spectrophotometer includes a housing 15 that is sized such that it may be hand-held by a user. Fingergrips 20 may be formed on the exterior of the housing 15 to accommodate a user's fingers. To measure color properties of an object, the housing includes a sample aperture 25 formed through an exterior wall against which an object under test is placed.

The color measurement components of the color measuring device 10 are well known in the art. They include, for example, an integrating sphere 30 that is hollow and has an inner surface that is highly reflective. A light source 35 is mounted to the sphere to provide light within the sphere and diffusely illuminate the object under test through the sample aperture 25. Light reflected from the object under test is directed to a data collection means, for example, a light measuring sensor 40 such as a photodiode array or other photodetector devices as is known in the art. The light sensor generates color data signals representative of the light reflected from the object under test. It will be appreciated, as is known in the art, that the color data signals may be processed according to the functions of the color measuring device. For example, the color data signals may be communicated as raw electronic impulses, may be converted to reflectance data that, for example, corresponds to the amount of reflection wavelength by wavelength for the measured light, or may be converted into Lab or XYZ terms.

Other components of the color measuring device 10, as is known in the art, include a charger printed circuit board 50, a flash capacitor 55, a connector 60 for external power and communications cable (e.g. RS232), and a removable battery 65. Other components (not shown) include a serial port for external communication of data.

With further reference to FIG. 1A, the housing 15 includes a mounting surface 100 to which an independently operable processing device 105 (hereinafter "IOPD") can be mounted and attached. The mounting surface 100 forms part of the housing or can be pivotally attached or hinged to the housing 15 such that the IOPD can be selectively positioned at different angles relative to the housing once it is mounted. The IOPD 105 is a stand-alone general purpose computing device such as, for example, a personal digital assistant (hereinafter "PDA") made by 3Com® or any other portable computing devices available and known in the art. These include, for example, Palm® OS devices, Windows® CE devices, portable personal computers, pocket computers and the like. The IOPD 105 includes, for example, a microprocessor, memory, data storage, a display, communication components and/or other components as is known in the art that form an stand-alone computing device. The display presents a graphical user interface that displays information to a user and allows a user to easily input data. The display includes a touch activated screen, button control or a combination of both.

With reference to FIGS. 1B, 2A and 2B, the color measuring device 10 includes an interface 110 that electrically and physically connects to the IOPD 105 to establish communication therebetween and directly connect the IOPD 105 to the color measuring device. It will be appreciated that depending on the configuration of the IOPD 105, a different configuration for the interface 110 is needed in order to directly connect with the interface port of the IOPD 105 as is known in the art. Also shown in FIG. 2A is an exemplary display 115 and function keys 120 for selecting and inputting data by the user. With the interface 110, the IOPD 105 can be easily disconnected and removed by pulling it out by hand. Alternately, the IOPD can be embedded in the color measuring device 10 which, although removable, would not be easily disconnected by hand.

The IOPD 105 includes application software that allows it to communicate and operate the functions of the color measuring device 10. Once the remote processing device 105 is connected to the interface 110, the device becomes an autonomous portable color measuring device. The IOPD 105 provides data storage for the color measuring device and performs calorimetric calculations from measurements taken by the color measuring device. Of course, other types of processing and data analysis can be performed as is known in the art. For example, measurement of absolute color represented in various colorimetric formats (CIE, etc.); the measurement of relative color represented in various calorimetric formats; color matching by using one or more databases of pre-measured colors and color searching and comparison analysis algorithms as is known in the art; graphic display of calorimetric values for various color standards; and color quality control functions such as acceptance of an unknown color sample to a known reference sample. The data is then displayed to the user in a variety of formats including numerical and/or graphical outputs on the display 115.

Due to the independent functionality of the IOPD 105, it can be replaced and interchanged with a different IOPD from another color measuring device. In doing so, the color measuring device is re-characterized with the preferences existing in the different IOPD. In this manner, a user can simply remove their preprogrammed IOPD 105 from a first color measuring device and connect it to a second color measuring device so that the second color measuring device operates in the same manner as the first color measuring device.

Other configurations are possible with the IOPD 105 and color measuring device 10 combination rather than being a self-contained color measuring device. For example, the color measuring device 10 can be connected to a remote computer which performs calorimetric functions without using the IOPD 105 (which can be connected or not). The IOPD 105 can be removed and connected to a computer via connections of various types, for example, RS-232, universal serial bus, wireless connection, intranet, infrared communications, and global networks. Once connected, color data can be transmitted in various formats for different color processing applications. In another configuration, the remote processing device 105, while connected to the color measuring device 10, can transmit information in various formats as stated above to the internet, a remote network or computer by direct connection or by wireless communication as is know in the art. For wireless communication, the IOPD 105 includes a signal transmitter and receiver and associated circuitry as is known in the art.

The IOPD 105 includes an industry standard operating system and user interface. This results in less training and easier operation of the color measuring device for users familiar with the standard operating system and interface. Using the standard operating system of the IOPD, software development is made easier and faster as well as hardware development. Upgrading the processing system of the color measuring device 10 is performed simply by replacing the IOPD 105 with a newer model and loading the color measuring device application software on it.

Another configuration includes connecting the color measuring device with an interface to a personal computer. Then the color measuring device can be transparent to the system while the remote processing device 105 and the personal computer directly exchange color information. Another configuration includes detaching the IOPD from the color measuring device and directly connecting it to a personal computer. Color data is then exchanged therebetween. Upgrades to the color measuring device software application on the IOPD can be performed by downloading a new version of the software from an internet site, from a remote computer, or by using other downloading or software installation techniques as is known in the art. The software application can also be "tied" to a particular color measuring device, for example at the time of registration, which prevents unauthorized copying.

The present invention has many applications to measure color attributes, perform color matching, color analysis, color verification, and other calculations. Exemplary applications include measuring textiles, inks, plastics, powdered substances, liquid substances, metals, paints, metallic paints, cosmetics, food stuffs, wood stuffs, and paper. Of course, one of ordinary skill in the art will appreciate that the present invention can be used for other applications and can be programmed to perform other desired functions associated to color measuring and analysis. Although the above examples have been described using an integrating sphere, other types of spectrophotometers and/or color measuring devices can be used. For example, spectrophotometers commonly referred to as 0/45 or 45/0 sensor based instruments, other sphere based spectrophotometers, Gonio spectrophotometers, colorimeters or densitometers.

With reference to FIGS. 3A and 3B, the present invention is shown having an alternative configuration. FIG. 3A shows a transparent top view of the color measuring device 10 and FIG. 3B shows a transparent side view showing the inner components. In this configuration, the color measuring device generally is positioned horizontal to the object being measured which would be positioned against the sample aperture 25. This type of configuration is suited for the print and ink industries. Also shown on the housing 15 is a cover 200 which can be snapped-on or hinged to the housing 15. The cover 200 secures the IOPD 105 to the housing and serves to protect it. The cover 200 includes a window such that a user can view the processing device 105 therethrough. Of course, the cover 200 can be used with the color measuring device configuration described above. Also shown is a power supply 210 and a stapler foot-type targeting device 215 that helps a user align a test sample with the aperture 25. The targeting device 215 is hinged to the housing 15 at 220 for movement.

The invention has been described with reference to the preferred embodiment. Obviously, modifications and alterations will occur to others upon a reading and understanding of this specification. It is intended to include all such modifications and alterations insofar as they come within the scope of the appended claims or the equivalence thereof.

We claim:

1. A color measuring device for measuring color properties of an object comprising:
    a light source for transmitting light onto the object;
    a sensor for sensing light reflected from the object and generating electrical signals corresponding to the sensed light;
    a portable housing containing the light source and the sensor;
    a mounting portion on the portable housing configured for mounting a portable independently operable computing device; and
    an interface configured for electrically connecting a portable independently operable computing device to the portable housing and for communicating the electrical signals from the sensor to a portable independently operable computing device once mounted to the mounting portion and connected to the interface.

2. The color measuring device as set forth in claim 1 further including a portable independently operable computing device mounted to the mounting portion of the portable housing and connected to the interface.

3. The color measuring device as set forth in claim 2 wherein the portable independently operable computing device is removable and includes software allowing a user to control operation of the color measuring device and for processing the electrical signals into color properties of the object.

4. The color measuring device as set forth in claim 2 wherein the portable independently operable computing device is embedded within the color measuring device.

5. The color measuring device as set forth in claim 1 wherein the mounting portion is pivotally attached to the portable housing such that once a portable independently operable computing device is mounted thereto, the portable independently operable computing device is selectively positionable.

6. The color measuring device as set forth in claim 1 further including an integrating sphere attached to the portable housing, the light source illuminating an interior of the integrating sphere and transmitting light onto the object.

7. The color measuring device as set forth in claim 1 wherein the portable housing includes a cover for enclosing a portable independently operable computing device that is mounted to the portable housing, the cover having a window such that the portable independently operable computing device is visible therethrough.

8. A color measuring device comprising:
    a housing;
    data collection means for collecting color data from an object, the data collection means being attached to the housing;
    a communication interface connected to the housing;
    an independently operable processing device attached to the housing and being connected to the communication interface, the independently operable processing device receiving the color data from the data collection means via the communication interface and processing the color data into color properties; and
    the independently operable processing device being a hand-held computing device.

9. The color measuring device as set forth in claim 8 wherein the independently operable processing device includes a display for displaying data to a user.

10. The color measuring device as set forth in claim 8 wherein the housing includes a mounting surface formed thereon for mounting the independently operable processing device thereto.

11. The color measuring device as set forth in claim 10 wherein the mounting surface is hinged to the housing such that the independently operable processing device is selectively positionable in relation to the housing.

12. The color measuring device as set forth in claim 8 wherein the color measuring device further includes an integrating sphere for diffusely illuminating the object, and wherein the data collection means includes a sensor for sensing light reflected from the object and generating electrical signals corresponding to the sensed light.

13. The color measuring device as set forth in, claim 8 wherein the independently operable processing device includes a graphical user interface for receiving input from a user to control the color measuring device.

14. The color measuring device as set forth in claim 8 wherein the independently operable processing device includes at least one of software for controlling operation of the color measuring device, software for interpreting the color data, and software for processing the color data.

15. The color measuring device as set forth in claim 8 wherein the independently operable processing device includes a wireless communication means for communicating color data from the color measuring device to a remote network.

16. The color measuring device as set forth in claim 8 wherein the independently operable processing device is removable from the housing.

17. The color measuring device as set forth in claim 8 wherein the independently operable processing device is embedded into the color measuring device.

18. The color measuring device as set forth in claim 8 wherein the independently operable processing device includes an expansion slot for connection to the communication interface of the color measuring device.

19. The color measuring device as set forth in claim 8 wherein the color measuring device is a spectrophotometer.

20. A color measuring device comprising:

a housing;

data collection means for collecting color data from an object, the data collection means being held by the housing;

a communication interface connected to the housing and in communication with the data collection means; and a portable independently operable processing device attached to the housing forming an autonomous color measuring device, the portable independently operable processing device being connected to the communication interface and being removable therefrom, the independently operable processing device controlling the operation of the color measuring device through the communication interface.

21. The color measuring device of claim 20 wherein the data collection means includes a photodetector.

22. The color measuring device of claim 20 wherein the color measuring device is a spectrophotometer.

23. The color measuring device of claim 20 wherein the portable independently operable processing device includes executable software that controls the operation of the color measuring device.

24. A color measuring device for measuring color properties of an object comprising:

a light source for transmitting light onto the object;

a sensor for sensing light reflected from the object and generating electrical signals corresponding to the sensed light;

a portable housing containing the light source and the sensor;

a mounting portion on the portable housing configured for mounting a portable independently operable computing device; and an interface on the portable housing configured to electrically and physically connect thereto a portable independently operable computing device that controls the operation of the color measuring device via the interface once mounted to the mounting portion and connected to the interface.

25. The color measuring device as set forth in claim 24 further including a portable independently operable computing device mounted to the mounting portion of the portable housing and connected to the interface.

26. The color measuring device as set forth in claim 25 wherein connecting the portable independently operable computing device to the interface forms an autonomous color measuring device.

27. The color measuring device as set forth in claim 25 wherein the portable independently operable computing device is a hand-held computer having executable software that controls operation of the color measuring device.

28. The color measuring device as set forth in claim 25 wherein the portable independently operable computing device is embedded within the color measuring device.

29. The color measuring device as set forth in claim 25 wherein the portable independently operable processing device is removable from the housing.

* * * * *